(12) United States Patent
Adari

(10) Patent No.: US 11,463,245 B2
(45) Date of Patent: Oct. 4, 2022

(54) INTERNET OF THINGS (IOT) BASED WIRELESS TRACKING, MONITORING AND ANTI-TAMPER PARCEL PACKAGING

(71) Applicant: Swarna Kumari Adari, Visakhapatnam (IN)

(72) Inventor: Swarna Kumari Adari, Visakhapatnam (IN)

( * ) Notice: Subject to any disclaimer, the term of this patent is extended or adjusted under 35 U.S.C. 154(b) by 107 days.

(21) Appl. No.: 17/050,499

(22) PCT Filed: Apr. 26, 2019

(86) PCT No.: PCT/IB2019/053456
§ 371 (c)(1),
(2) Date: Oct. 26, 2020

(87) PCT Pub. No.: WO2019/207545
PCT Pub. Date: Oct. 31, 2019

(65) Prior Publication Data
US 2021/0243019 A1     Aug. 5, 2021

(30) Foreign Application Priority Data

Apr. 26, 2018   (IN) .............................. 201841015787

(51) Int. Cl.
*H04L 9/08*     (2006.01)
*G16Y 30/10*    (2020.01)
*G16Y 40/35*    (2020.01)
*H04L 67/12*    (2022.01)

(52) U.S. Cl.
CPC ............ *H04L 9/0863* (2013.01); *G16Y 30/10* (2020.01); *G16Y 40/35* (2020.01); *H04L 67/12* (2013.01)

(58) Field of Classification Search
CPC ....... H04L 9/0863; H04L 67/12; G16Y 30/10; G16Y 40/35
See application file for complete search history.

(56) References Cited

U.S. PATENT DOCUMENTS

2001/0010494 A1* 8/2001 Herbert ................ G08B 13/126
                                                340/568.1
2017/0243233 A1* 8/2017 Land ........................ G06F 16/51
2018/0108024 A1* 4/2018 Greco ................... H04W 12/06

* cited by examiner

*Primary Examiner* — Normin Abedin

(57) ABSTRACT

The present disclosure relates to a parcel monitoring system, method and electronic device (e-device) for secure packaging, shipment, receipt and tracking of parcels. The tamper-proof seal (102) can include a transceiver (406) to communicate with one more devices at remote location to transmit information associated with the package, and a plurality of slots (408-1, 408-2, 408-3, 408-4) adapted to receive one or more strings (104) in each of said plurality of slots (408-1, 408-2, 408-3, 408-4). In an embodiment, the said one or more strings (104) are electrically connected to each of said plurality of slots such that an interruption in said electrical connection triggers said transceiver (406) to transmit a notification to said one more devices as an indication of seal tampering.

8 Claims, 3 Drawing Sheets

INTERNET OF THINGS (IOT) BASED WIRELESS TRACKING, MONITORING AND ANTI-TAMPER PARCEL PACKAGING

FIELD OF DISCLOSURE

The present disclosure relates to the field of package tracking, and more particularly it relates to a parcel monitoring system, method and electronic device (e-device) for secure packaging, shipment, receipt and tracking of parcels/shipments.

BACKGROUND OF THE DISCLOSURE

Goods (item or articles or parcel or thing, article, object, unit, module, artifact, piece, commodity, product, etc.) which are transported via shipping containers or humans or shipments need to be monitored for the security of the goods, the location of the goods, and the environmental status of the goods. Mechanical security seals on container doors can be tampered and restored or replaced to approximate condition so as to pass a casual inspection, so that pilfered or tampered goods are not discovered until the container is opened at the destination.

When sending a parcel by courier, it is often imperative for either the sender or intended recipient to know the location of the parcel and ideally when the parcel will be delivered. This is of particular importance when waiting for a parcel to be collected or delivered as the relevant party may not always be available to hand over or receive the parcel, as the case may be, resulting in unwanted and unforeseen delivery delays.

Current systems enable a sender and intended recipient to view the progress of a delivery at predetermined milestones such as collection time, delivery time and arrival at processing hub. This is done by either contacting the relevant courier company by phone, email or logging on to the courier's website and inputting the waybill information.

The aforementioned tracking systems require the users to pull information from the courier and do not allow real-time tracking of the parcel. These systems neither proactively updates the sender or recipient as and when such crucial milestones are achieved, nor do they indicate when material delivery delays are likely. In addition, the waybill information may not be readily available when the sender or recipient requires a delivery progress update. By example, the waybill may only be tractable online and the recipient has no internet access at that moment. It is an object of the invention to at least partially ameliorate the abovementioned disadvantages associated with monitoring the delivery of parcels utilizing courier systems.

Conventional electronic security seals (e-Seals) improve upon mechanical seals, as they can provide a wireless report of a security tamper. Power consumption limits battery powered e-Seals to infrequent location and reporting updates. Environmental monitoring of the container goods can be performed using chart recorders inside the container, which do not provide real-time knowledge of temperature, humidity or shock damage to the goods until the container is opened at the destination. The practical use of conventional e-Seals is limited by the high cost of such devices.

While the world of e-commerce is fast growing, however utilizing advanced technology and science so many frauds takes place in e-commerce field as well due to poor secure packages and non-real time package location tracking and delivery proof.

Based on the above defects, there exists a dire need enabling digital security and real time tracking mechanism to the parcel.

SUMMARY OF THE INVENTION

The present disclosure relates to the field of package tracking, and more particularly it relates to a parcel monitoring system, method and electronic device (e-device) for secure packaging, shipment, receipt and tracking of parcels (a package bearing the name and address of the recipient in order to be routed through the services of a postal service or by express package delivery service to the recipient).

In order to solve the shortcomings of the prior art, the present invention provides digital security and real time tracking mechanism to the parcel.

Accordingly, embodiments of the present disclosure relate to a system comprising an electronic device (e-device) for attaching to a cover sealing a physical asset (object), and one or more ribbons/yarns provided over the cover to achieve tight sealing. The ribbons/yarns are operably/electronically connected to the electronic device (e-device).

In an exemplary embodiment, the e-device can be added to the parcel (cover sealing the physical asset), preferably on top. While preparing the parcel, an e-commerce operator may transfer an order ID and a Delivery OTP (which can be dynamically generated) to the e-device. In an exemplary embodiment, the same delivery OTP (DOTP) generated may be sent to the customer/recipient (who purchased the item), so that only the customer/recipient knows the delivery OTP except the e-device.

In an exemplary embodiment, the operator ties/attach the box with the e-device (which can be a digital IoT device) which includes a keypad and a display to enter the DOTP at the time of deliver the item. The e-device is tightly coupled and controlled by the chip which may be embedded in the e-device.

In an exemplary embodiment, upon delivery of the parcel, the customer/recipient needs to enter the DOTP on the display of the e-device which was received earlier for authentication. The e-device may then authenticate the entered DOTP and if successful the tags/ties may be release automatically from the box.

In an exemplary embodiment, once tags/ties are released a 'Delivered Successfully' message will be displayed on the screen and this message remains on display until and unless operator resets the chip. Upon entering the DOTP, an SMS will also be sent to the buyer stating that the item is delivered successfully with the specific location name as well as the same message will be recorded in the operator database for future reference.

In an exemplary embodiment, the e-device may be capable to transmitting real-time GPS information so operators as well as the customer can track these items on their monitor in real-time without contacting courier partners.

In an exemplary embodiment, the delivery boy/device can take the e-device along with them and they can handover to the operator. The operator can use these IOT devices N numbers of times for different parcels by resetting the device.

In an exemplary embodiment, in case if anyone tries to tamper the parcel or remove or cut the tags forcefully without entering the valid DOTP then a 'UNDELIVERED/TEMPERED' message will be displayed on the screen. This message remains on the display until and unless the operator resets the chip. So operators can easily find it out whether the order is delivered to the right person or tempered in between.

In an exemplary embodiment, the present invention also includes a fail-safe feature of the device. This feature is provided in case if the main device is malfunctioned the e-device also has secondary option to deliver the product to the customer. To activate the secondary mechanism the delivery person should connect external e-device to the primary device by using wired or wireless mode. Once both the devices are linked then the secondary device directly communicate with the primary device hardware. If there is any problem in primary device hardware then the secondary device directly gain the access the tags mechanism and the memory system. Now user needs to enter the DOTP on secondary device keypad. Now secondary device reads the memory of the primary device and if it matches then then secondary device will release the tags from the primary device. Once the tags are released the secondary device sends the delivery status message to the operator and customer.

In another exemplary embodiment, if there is no problem with primary device hardware but with power supply problem then the secondary device can provide the power supply to the primary device then user need to enter the DOTP on primary device keypad and after verification the tags will be released automatically. Then the primary device can send delivery status messages to both operator and the customer.

Various objects, features, aspects and advantages of the present disclosure will become more apparent from the following detailed description of preferred embodiments, along with the accompanying drawing figures in which like numerals represent like features.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

The present disclosure relates to the field of package tracking, and more particularly it relates to a parcel monitoring system, method and electronic device (e-device) for secure packaging, shipment, receipt and tracking of parcels (a package bearing the name and address of the recipient in order to be routed through the services of a postal service or by express package delivery service to the recipient).

Accordingly, embodiments of the present disclosure relate to a system comprising an electronic device (e-device) for attaching to a cover sealing a physical asset (object), and one or more ribbons/yarns provided over the cover to achieve tight sealing. The ribbons/yarns are operably/electronically connected to the electronic device (e-device).

Figure 1:
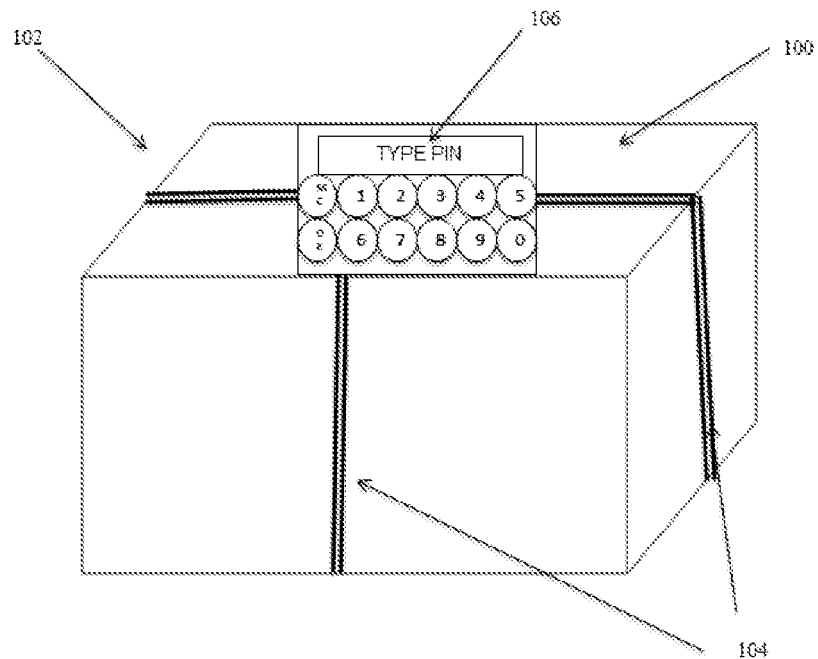
FIGS. 1-2 illustrate an exemplary implementation of the proposed invention and working of the proposed invention.
Figure 2:
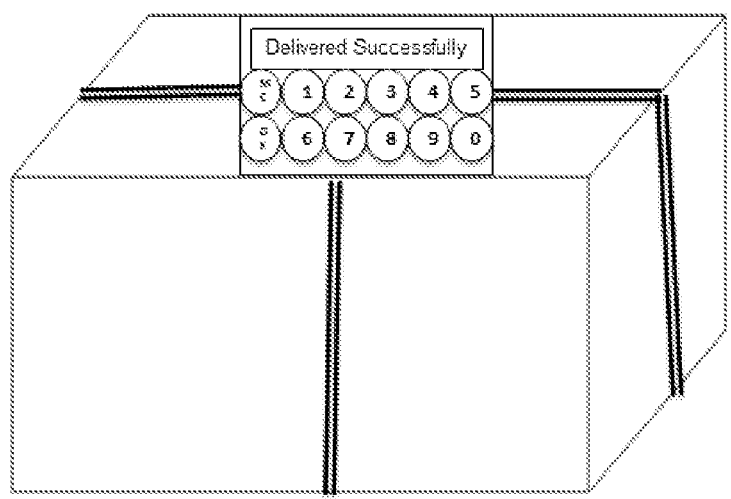

FIGS. 1-2 illustrate an exemplary implementation of the proposed invention and working of the proposed invention.

In an exemplary embodiment, the e-device can be added to the parcel (cover sealing the physical asset), preferably on top. While preparing the parcel, an e-commerce operator may transfer an order ID and a Delivery OTP (which can be dynamically generated) to the e-device. In an exemplary embodiment, the same delivery OTP (DOTP) generated may be sent to the customer/recipient (who purchased the item), so that only the customer/recipient knows the delivery OTP except the e-device.

In an exemplary embodiment, the operator ties/attach the box with the e-device (which can be a digital IoT device) which includes a keypad and a display to enter the DOTP at the time of deliver the item. The e-device is tightly coupled and controlled by the chip which may be embedded in the e-device.

In an exemplary embodiment, upon delivery of the parcel, the customer/recipient needs to enter the DOTP on the display of the e-device which was received earlier for authentication. The e-device may then authenticate the entered DOTP and if successful the tags/ties may be release automatically from the box.

In an exemplary embodiment, once tags/ties are released a 'Delivered Successfully' message will be displayed on the screen and this message remains on display until and unless operator resets the chip. Upon entering the DOTP, an SMS will also be sent to the buyer stating that the item is delivered successfully with the specific location name as well as the same message will be recorded in the operator database for future reference.

In an exemplary embodiment, the e-device may be capable to transmitting in real-time GPS information so operators as well as the customer can track these items on their monitor in real-time without contacting courier partners.

In an exemplary embodiment, the delivery boy/device can take the e-device along with them and they can handover to the operator. The operator can use these IOT devices N numbers of times for different parcels by resetting the e-device.

Figure 3:
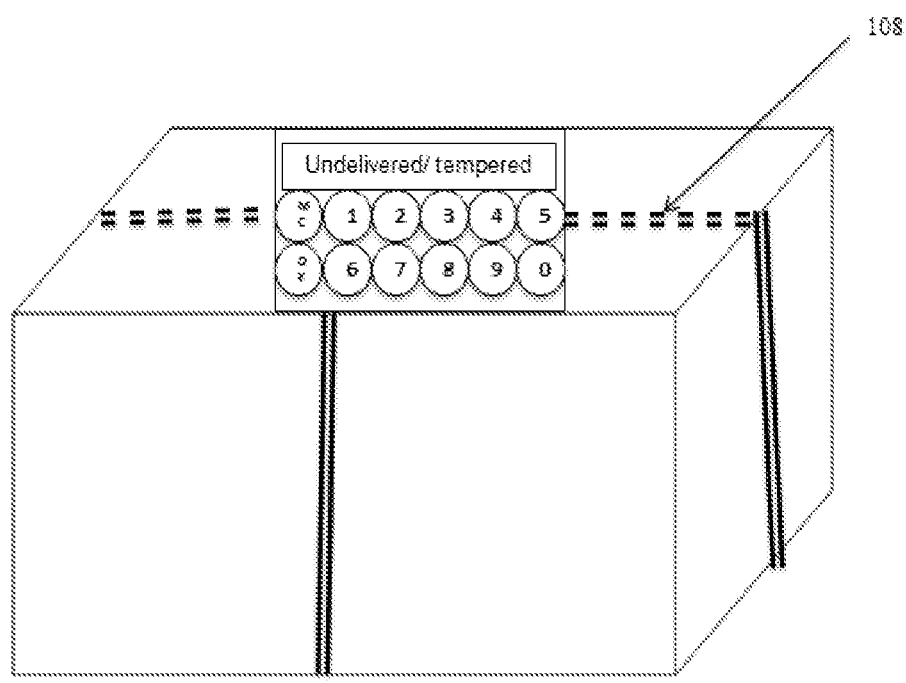
FIG. 3 illustrates an exemplary implementation of the proposed invention and working of the proposed invention in case of package tampering.

In an exemplary embodiment, in case if anyone tries to tamper the parcel or remove or cut the tags forcefully without entering the valid DOTP then a 'UNDELIVERED/TEMPERED' message will be displayed on the screen. This message remains on the display until and unless the operator resets the chip. So operators can easily find it out whether the order is delivered to the right person or tempered in between FIG. 3 illustrates an exemplary implementation of the proposed invention and working of the proposed invention in case of package tampering. 108 illustrates that the package is tempered with as the seal is not secured.

In an embodiment, the e-device includes one or more motors. In an exemplary embodiment, once the packaging tags/threads/ribbons are inserted in the device slots, the device can automatically tighten the tags and once operator set the e-device i.e., in lock mode, the e-device i.e., in lock mode, the e-device check the tension of the tags periodically.

In an exemplary embedment, if the tags are cut or removed forcefully in between and if the device detects any changes in the tags pressure and tension then the device automatically displays the message like 'Package Tempered' on the screen and this will remain same until and unless operator resets the device. The customer cannot enter the DPIN once the message is displayed as 'Package Tempered'.

Figure 4:
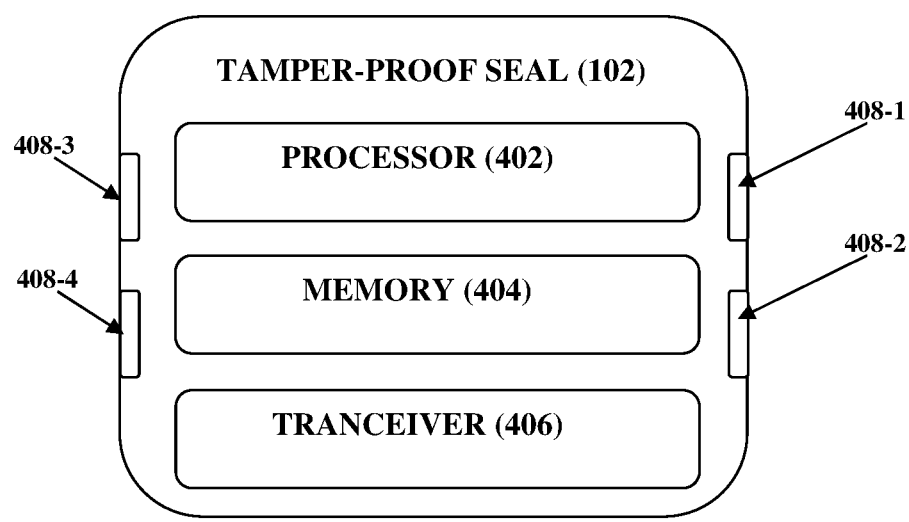
FIG. 4 illustrates an exemplary tamper-proof seal (102) for a package (100).

FIG. 4 illustrates an exemplary tamper-proof seal (102) for a package (100). The package (100) can receive and enclose an article or an object. In an exemplary implementation, the tamper-proof seal (102) can include a transceiver (406) to communicate with one more devices at remote location to transmit information associated with the package, and a plurality of slots (408-1, 408-2, 408-3, 408-4) adapted to receive one or more strings (104) in each of said plurality of slots (408-1, 408-2, 408-3, 408-4). In an embodiment, the said one or more strings (104) are electrically connected to each of said plurality of slots such that an interruption in said electrical connection triggers said transceiver (406) to transmit a notification to said one more devices as an indication of seal tampering.

In an exemplary embodiment, the one or more strings (104) encloses said package to provide tight sealing.

In an exemplary embodiment, the tamper-proof seal (102) includes a display (106) to provide said information associated with the package.

In an exemplary embodiment, the said display (106) is configured to receive one or more inputs from a recipient of said package (100), the one or more received inputs are matched with one or more pre-configured inputs in said tamper-proof seal for verification. In another exemplary embodiment, the electrical connection, upon verification, is disconnected and the one or more strings are unlocked from each of said plurality of slots (408-1, 408-2, 408-3, 408-4).

In an exemplary embodiment, the transceiver (406) generates, upon said one or more strings (104) are electrically connected to each of said plurality of slots (408-1, 408-2, 408-3, 408-4), a notification to be transmitted to the one more devices.

In an exemplary embodiment, the notification is a one-time password or pin (OTP).

In an exemplary embodiment, the one more devices are associated at least with a recipient of the package, or a sender of the package or a sender and a recipient of the package.

In an exemplary embodiment, the tamper-proof seal is a digital Internet of Thing (IoT) device having a memory (404) and a processor (202).

In an exemplary embodiment, the tamper-proof seal comprises a GPS for transmitting real-time GPS information to the one or more devices.

In an implementation, the e-device can be embedded with/incorporated with one or more Internet of Things (IoT) devices. In a typical network architecture of the present disclosure can include a plurality of network devices such as transmitter, receivers, and/or transceivers that may include one or more IoT devices.

In an exemplary embodiment, the present invention also includes a fail-safe feature of the device. This feature is provided in case if the main device is malfunctioned the e-device also has secondary option to deliver the product to the customer. To activate the secondary mechanism the delivery person should connect external e-device to the primary device by using wired or wireless mode. Once both the devices are linked then the secondary device directly communicate with the primary device hardware. If there is any problem in primary device hardware then the secondary device directly gain the access the tags mechanism and the memory system. Now user needs to enter the DOTP on secondary device keypad. Now secondary device reads the memory of the primary device and if it matches then then secondary device will release the tags from the primary device. Once the tags are released the secondary device sends the delivery status message to the operator and customer.

In another exemplary embodiment, if there is no problem with primary device hardware but with power supply problem then the secondary device can provide the power supply to the primary device then user need to enter the DOTP on primary device keypad and after verification the tags will be released automatically. Then the primary device can send delivery status messages to both operator and the customer.

As used herein, the IoT devices can be a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a Wi-Fi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio.

A user may communicate with the network devices using an access device that may include any human-to-machine interface with network connection capability that allows access to a network. For example, the access device may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like. In some embodiments, the access device may include a cellular network transceiver radio or interface.

The operator may interact with the e-devices OR IOT enabled device using an application, a web browser, a proprietary program, or any other program executed and operated by the access device. In some embodiments, the e-device may communicate directly with the network devices (e.g., communication signal). For example, the access device may communicate directly with network devices using Zigbee™ signals, Bluetooth™ signals, WiFi™ signals, infrared (IR) signals, UWB signals, WiFi-Direct signals, BLE signals, sound frequency signals, or the like. In some embodiments, the e-device may communicate with the network devices via the gateways and/or a cloud network.

As in a typical network architecture of the present disclosure can include a plurality of network devices such as transmitter, receivers, and/or transceivers that may include one or more Internet of Things (IOT) devices. As used herein, an IOT devices can be a device that includes sensing and/or control functionality as well as a Wi-Fi transceiver radio or interface, a Bluetooth transceiver radio or interface, a Zigbee transceiver radio or interface, an Ultra-Wideband (UWB) transceiver radio or interface, a Wi-Fi Direct transceiver radio or interface, a Bluetooth Low Energy (BLE) transceiver radio or interface, and/or any other wireless network transceiver radio or interface that allows the IOT device to communicate with a wide area network and with one or more other devices. In some embodiments, an IOT device may include a cellular transceiver radio, and may be configured to communicate with a cellular network using the cellular network transceiver radio.

In an exemplary embodiment, the proposed system may include the e-device. It would be appreciated that the proposed e-device may be accessed by multiple users, through one or more computing devices, or applications residing on the computing devices. In an aspect, the proposed e-device can be operatively coupled to a website and so be operable from any Internet enabled computing device. Examples of the computing devices may include, but are not limited to, a portable computer, a personal digital assistant, a handheld device, and a workstation. The computing devices are communicatively coupled to the proposed robotic cleaner through a network.

In an exemplary embodiment, the proposed e-device may include at least one processing unit, an input/output (I/O) interface, and a memory. The at least one processing unit may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory. The I/O interface may include a variety of software and hardware interfaces, for example, a web interface, a graphical user interface, and the like. The I/O interface may allow the proposed e-device to interact with a user directly or through the client devices. Further, the I/O interface may enable the proposed e-device to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules, routines, programs, objects, components, data structures, etc., which perform particular tasks or implement particular abstract data types.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure.

ADVANTAGES OF THE INVENTION

The present disclosure provides device that can be used for any container but preferably for valuable items.

The present disclosure provides a device that can be reusable multiple times by resetting the device.

The present disclosure enables to generate the order ID and the Delivery OTP (is dynamically generated) that will be transferred to the device by the operator and at the same time the same delivery OTP will be sent to the customer. So no one knows the delivery OTP except the device and the customer.

The present disclosure provides enables the user to enter the OTP on this device itself by using mini keypad on the device.

The present disclosure upon entering the successful DOTP the device wills automatically unlocks the bindings/tags of the order.

The present disclosure enables if any tags are removed forcefully then the device will automatically display a message as 'Tempered' on the screen.

The present disclosure enables a mechanism so that no one can open unlock this device without DOTP.

The present disclosure provides a display that will show whether the order is delivered successfully or tempered.

The present disclosure enables the delivery person to handover this item and need to submit at office so that operators will know whether the item is delivered to right person or not.

The present disclosure enables real time tracking the order through GPS.

The present disclosure enables once the order is delivered the delivery status will be recorded in the operator's database.

The present disclosure provides a device which rechargeable with solar power.

The present disclosure allows no one to switch off the device except by the special device which can interact with this device.

According to the present disclosure if device is broken or purposefully damaged by anyone then the notification can send to the operator along with the geographical location of the device According to the present disclosure, once the delivery is successful or Tempered the message will be sent to the operator along with the location with geo tag.

I claim:

1. A reusable tamper-proof seal (102) for a package (100), the package (100) configured to receive and enclose an article or an object, the reusable tamper-proof seal (102) is comprises:
    a transceiver (406) to communicate with one or more devices at remote location to transmit information associated with the package;
    a memory (404) and a processor (402); and
    a plurality of slots (408-1, 408-2, 408-3, 408-4) adapted to receive one or more strings (104) in each of said plurality of slots (408-1, 408-2, 408-3, 408-4), wherein said one or more strings (104) are electrically connected to each of said plurality of slots such that an interruption in said electrical connection triggers said transceiver (406) to transmit a notification to said one more devices as an indication of seal tampering; and characterizing:
    a keypad to enter one or more inputs and the display screen (106) configured to receive one or more inputs from a recipient of said package (100) and display the inputs received from the keypad and a message on the display, the one or more received inputs are matched with one or more pre-configured inputs for authentication in said tamper-proof seal for verification and display the message on the screen based on the successful or failed authentication, wherein on successful authentication, the electrical connection disconnected and the one or more strings are unlocked from each of said plurality of slots (408-1, 408-2, 408-3, 408-4).

2. The reusable tamper-proof seal as claimed in claim 1, wherein said one or more strings (104) encloses said package to provide tight sealing.

3. The reusable tamper-proof seal as claimed in claim 1, where said tamper-proof seal (102) includes the display (106) to provide said information associated with the package.

4. The reusable tamper-proof seal as claimed in claim 1, wherein
    said transceiver (406) generates, upon said. one or more strings (104) are electrically connected to each of said plurality of slots (408-1, 408-2, 408-3, 408-4), a notification to be transmitted to the one more devices.

5. The reusable, tamper-proof seal as claimed in claim 1, wherein said notification is a one-time password or pin (OTP).

6. The reusable tamper-proof seal as claimed in claim 1, wherein the one more devices are associated at least with a recipient of the package, or a sender of the package or a sender and a recipient of the package.

7. The reusable tamper-proof seal as claimed in claim 1, wherein said tamper-proof seal is a digital Internet of Thing (IoT) device having a memory (404) and a processor (402).

8. The reusable tamper-proof seal as claimed in claim 1, wherein said tamper-proof seal comprises a GPS for transmitting real-time GPS information to the one or more devices.

\* \* \* \* \*